United States Patent [19]
Moll et al.

[11] Patent Number: 5,763,869
[45] Date of Patent: Jun. 9, 1998

[54] DATA CARRIER HAVING AN ELECTRONIC MODULE

[75] Inventors: Jürgen Moll, Sauerlach; Franz Weikmann; Michael Lamla, both of Müchen, all of Germany

[73] Assignee: Giesecke & Devrient GmbH, Munich, Germany

[21] Appl. No.: 687,424

[22] PCT Filed: Dec. 7, 1995

[86] PCT No.: PCT/EP95/04822

§ 371 Date: Aug. 8, 1996

§ 102(e) Date: Aug. 8, 1996

[87] PCT Pub. No.: WO96/18172

PCT Pub. Date: Jun. 13, 1996

[30] Foreign Application Priority Data

Dec. 8, 1994 [DE] Germany ............... 44 43 766.8

[51] Int. Cl.$^6$ .................................................. G06K 19/00
[52] U.S. Cl. ................... 235/487; 235/432; 235/492
[58] Field of Search ............................. 235/487, 432, 235/492

[56] References Cited

U.S. PATENT DOCUMENTS 5,559,314 9/1996 Ohno et al. .................. 325/487
5,597,998 1/1997 Ohno et al. .................. 235/487

FOREIGN PATENT DOCUMENTS 0 426 163 A1 8/1991 European Pat. Off.

*Primary Examiner*—Harold Pitts
*Attorney, Agent, or Firm*—Bacon & Thomas

[57] ABSTRACT

A data carrier having an electronic module includes an integrated circuit. The integrated circuit has not only has the usual components, but also an electronic check unit having a nonvolatile memory area and a separate interface. During normal operation of the data carrier, data are written additionally in the electronic check unit. If functional failure of the electronic module of the data carrier occurs, the data are still readable from the memory of the electronic check unit via the separate inter-face even if the integrated circuit is otherwise mechanically destroyed.

12 Claims, 3 Drawing Sheets

DATA CARRIER HAVING AN ELECTRONIC MODULE

BACKGROUND OF THE INVENTION

1. Field of the Invention

This invention relates to a data carrier having an electronic module comprising an integrated circuit with a control unit and at least one memory for storing data and communication means for communication of the integrated circuit with external apparatuses.

2. Description of Related Art

Data carriers of the abovementioned type have been known for some time, e.g. from EP 0 426 163 A1, and are increasingly used for money-equivalent applications, e.g. as telephone cards, toll cards, electronic purses, etc. In this case the memory of the integrated circuit of the electronic module is used for, among other things, recording transaction data and storing the current credit balance after a transaction. The data carrier known from EP 0 426 163 A1 contains not only the electronic module with a memory used in this way but also a nonvolatile display connected with the electronic module and located in the surface of the data carrier. The particular credit balance is indicated by this display and updated at each transaction under the control of the control devices of the electronic module of the data carrier. If the electronic module is mechanically destroyed and the data are thus no longer readable from the memory of the module, at least the current credit balance of the data carrier is still visible in the display and can be paid out to the owner of the inoperative data carrier.

Known data carriers of the abovementioned type fundamentally involve the problem that if the integrated circuit is destroyed or its function impaired unintentionally or with intent to defraud, there is no possibility to determine the actual data stock of the integrated circuit and thus for example the current credit balance. The institute issuing the cards must rely on what the card user says.

The suggestion known from EP 0 426 163 A1 is insufficient particularly in the case of fraudulent manipulation, since it is comparatively easy in this case to interrupt the connection between the module and the display without destroying the integrated circuit or the module, so that the credit balance can no longer be updated in the display via the electronic module although the electronic module itself remains operative. The data carrier can then be used with intent to defraud, as explained above. The suggestion known from EP 0 426 163 A1 even facilitates this type of fraudulent use to a certain extent, since the display can be used to simulate a credit balance no longer actually present.

SUMMARY OF THE INVENTION

It is therefore the objective of the invention to provide a data carrier from which data can still be read when the electronic module is malfunctioning and which is not readily usable with intent to defraud.

This objective is achieved according to the characterizing features of the main claim.

The basic idea of the invention is that the electronic module additionally contains at least one electronic check unit whose surface is small in relation to the surface of the integrated circuit of the module and which contains a nonvolatile memory in which data are written and all means allowing the nonvolatile memory to be read via a separate interface. The electronic check unit is preferably an integral part of the circuit of the module and placed in such a way as to be outside preferred break lines upon breakage of the integrated circuit. Further protective elements, for example protective diodes or fuses, can be provided to protect the check unit against excess voltages and/or excess currents.

The advantages achieved with the invention are to be seen in particular in that a data carrier having such an electronic module cannot readily be used fraudulently since the electronic check unit is part of the electronic module and thus the connection from the circuit to the electronic check unit cannot be purposefully interrupted. Nevertheless data can still be read from the electronic check unit if the integrated circuit of the module breaks. Finally no additional space needs to be provided for the electronic check unit on the card surface. A further advantage is that there is a high probability that the check unit will still be operative and can be read if the circuit is destroyed, for example by mechanical or electric action from outside or in general if the function of the circuit is impaired due to a hardware error or a logic error.

According to a first embodiment of the invention the electronic check unit contains a nonvolatile memory which can be read in contacting fashion via contact surfaces likewise located in the electronic check unit. In this and the further embodiments the nonvolatile memory can be formed e.g. as an EEPROM.

According to a further embodiment the electronic check unit contains a nonvolatile memory and a digital-to-analog converter for converting the stored digital data to an analog signal and determining them.

Finally it is also possible to give the nonvolatile memory of the check unit a noncontacting design for example by means of a coil, or to provide other devices in the check unit for making the content of the nonvolatile memory externally accessible.

The electronic check unit can also be formed as a separate unit which is preferably part of the electronic module along with the integrated circuit.

Further advantages and embodiments of the invention will be explained in connection with the following figures, in which:

DETAILED DESCRIPTION OF THE PREFERRED EMBODIMENTS

Figure 1:
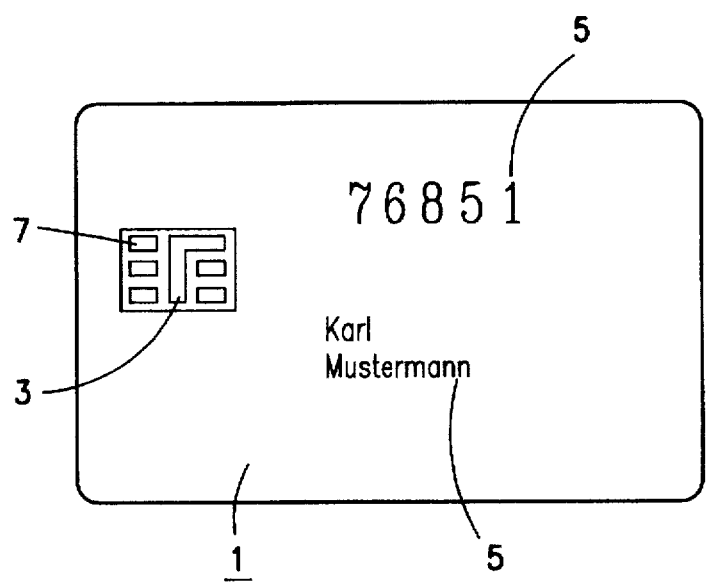
FIG. 1 shows a data carrier in a plan view.

FIG. 1 shows data carrier 1 in the form of an IC card with electronic module 3 for contacting data exchange in a plan view. Both the outside dimensions of the IC card and the position of the electronic module are fixed in a standard. On the surface of IC card 1 alphanumeric data 5 designating e.g. the name of the card owner, etc., can be present depending on the application of the card. Electronic module 3 contains an integrated circuit which is connected electrically with the communication means, i.e. with contact surfaces 7 in the shown example. The circuit and the conductive connections from the circuit to the contact surfaces are usually cast with a casting compound for protection from mechanical loads. The range of application of the invention is not restricted to the IC card with contact surfaces shown in FIG. 1. The invention can also be used in the same way for IC cards having noncontacting coupling, wherein data exchange takes place for example via a coil disposed in the IC card.

Figure 2:
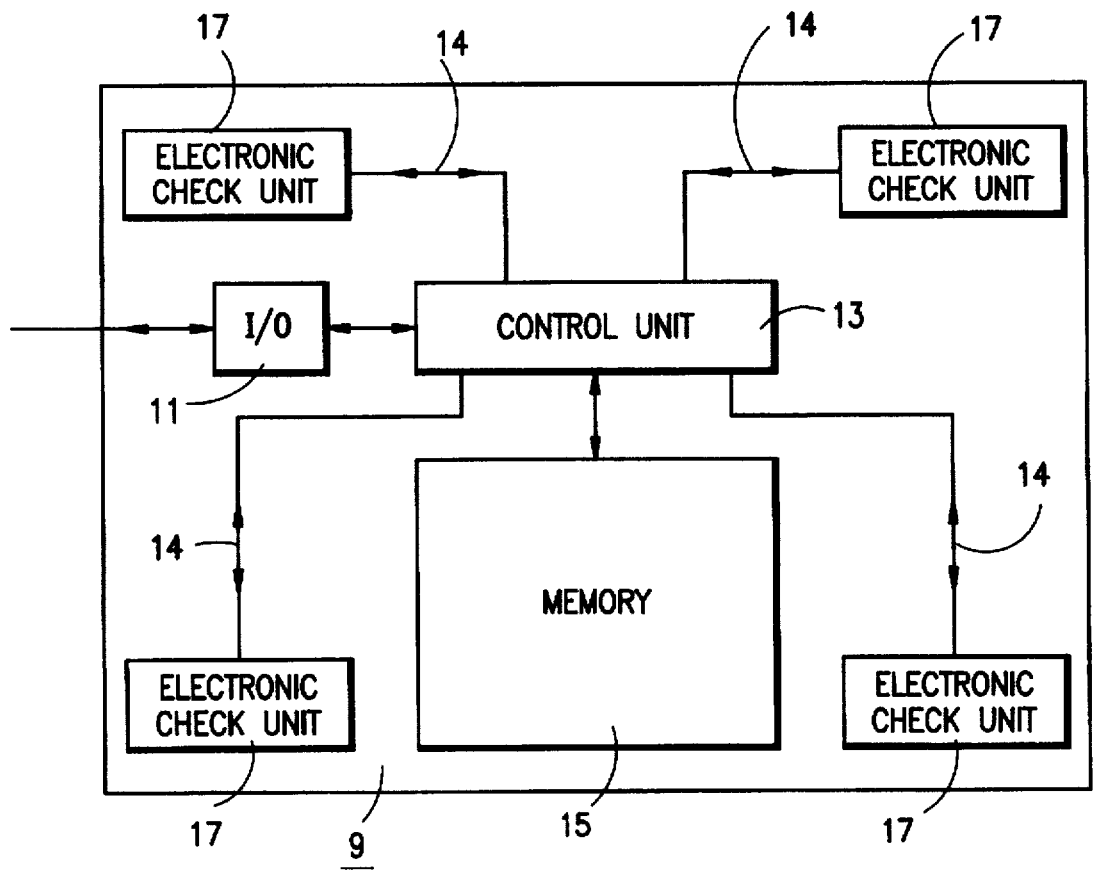
FIG. 2 shows the integrated circuit of the electronic module.

FIG. 2 shows integrated circuit 9 of the electronic module which contains serial data input/output interface 11, control unit 13 and memory 15. Control unit 13 can be present either as a hard-wired unit or as a microprocessor. The stated elements and their cooperation are known in the art and need therefore not be explained more closely.

Memory 15 is formed as a nonvolatile memory and the transaction data are written therein during a transaction with the data carrier. If a functional failure of the integrated circuit occurs, data can no longer be read from memory 15. In particular if the circuit breaks, its usual components, such as control unit 13 and memory 15, can be mechanically destroyed and are thus no longer accessible. It is likewise conceivable for the circuit to be damaged by inadmissibly high currents or voltages. The circuit could also be impaired in its function by one of its components failing for example due to a material defect or aging or by a connection being interrupted. There is fundamentally also the possibility of a logic error, the chip being in a logic state in which proper operation is no longer possible for example due to an attempt at manipulation. One therefore provides on the integrated circuit according to the invention at least one electronic check unit 17 whose surface is small in comparison to the surface of circuit 9 and which will thus most likely remain intact if the integrated circuit breaks. The ratio of the surface area of integrated circuit 9 to that of electronic check unit 17 is approximately in the range of 50:1 to 10:1. Data are written in or read from electronic check unit 17 via necessary lines 14 under the control of control unit 13 during proper communication of the data carrier with an external device. If there is a functional failure of the integrated circuit the data can at least be read via a separate interface.

The probability of electronic check unit 17 remaining intact upon breakage of the circuit can be increased if it is placed outside the preferred break lines of the integrated circuit. In addition a plurality of electronic check units 17 can also be provided, as already shown in FIG. 2, so that at least one of these units will most probably remain intact upon breakage of the integrated circuit. Lines 14 and any further lines between check unit 17 or check units 17 and components of circuit 9 can be provided with suitable protective elements, for example fuses and/or protective diodes, to protect check unit or units 17 from inadmissibly high currents and/or voltages.

FIG. 2 shows electronic check unit 17 as an integral part of circuit 9. This is a preferred embodiment, since in this case it is almost impossible to interrupt lines 14 from control unit 9 to electronic check unit 17 purposefully, even if circuit 9 is not surrounded by a casting compound. However it is also possible to form electronic check unit 17 as a separate integrated circuit connected via lines 14 with circuit 9. In this case it is advantageous to place electronic check unit 17 in close proximity to the circuit, so that purposeful interruption of the connection is only possible after removal of the casting compound usually surrounding the sensitive components of the module. The fraudulent manipulation would thus be evident. Separate electronic check unit 17 is of course also formed so small that it will most likely remain intact upon mechanical load on the electronic module leading to breakage of integrated circuit 9.

FIGS. 3 to 6 show embodiments of electronic check unit 17. The electronic check unit generally contains nonvolatile memory area 19 in which data are written or from which data are read during normal operation via lines 14 not shown in FIGS. 3 to 6. Only important data are preferably stored in order to minimize the space requirement of the memory and thus the space requirement of the electronic check unit. Should e.g. exclusively the latest data record or parts of the latest data record (e.g. the current credit balance) be stored, one needs only a few memory cells. Furthermore electronic check unit 17 generally disposes of separate means which permit access to the nonvolatile memory even when the usual write/read access to electronic check unit 17 via control unit 13 of the circuit (see FIG. 2) is no longer possible. Electronic check unit 17 is thus a self-sufficient area from which data can at least still be read independently of the operativeness of the other components of integrated circuit 9 (see FIG. 2).

It is not possible to write data in memory area 19 via the separate interface in the shown examples, since e.g. the programming voltage cannot be applied via the separate interface. This has the advantage that the stored data cannot be changed with intent to defraud. The separate interface can of course also be designed, if required, so as to permit data to be written in memory 19 via it.

Figure 3:
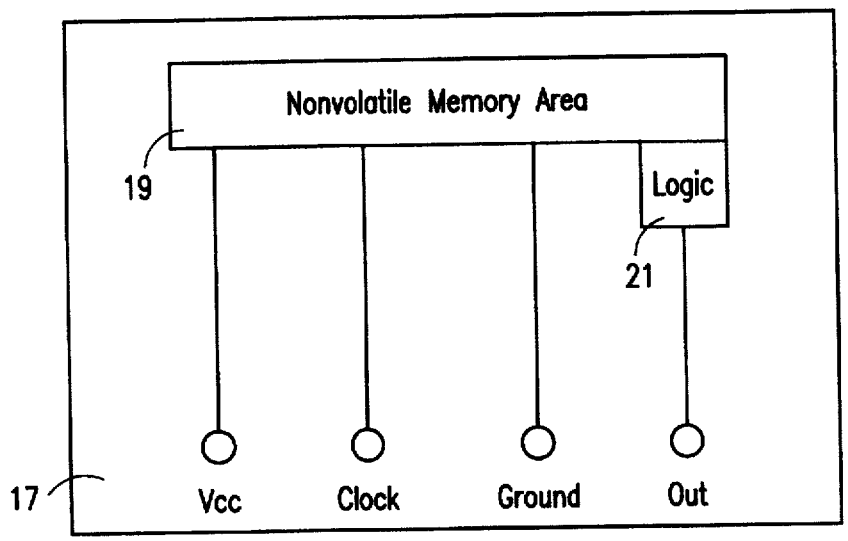
FIG. 3 shows an electronic check unit.

FIG. 3 shows electronic check unit 17 constructed similarly to integrated circuit 9. It thus includes of nonvolatile memory area 19, control logic 21 and separate contact surfaces for the ground connection "Ground", supply voltage "$V_{cc}$", clock connection "Clock", and "Out" for reading data.

If required, the data can be read from memory area 19 via the separate contact surfaces if one removes the casting compound from the electronic module and applies the corresponding signals or voltages to the contact surfaces. The readout of data from memory area 19 is then controlled by control logic 21 which addresses the memory area, temporarily stores the data read from the memory and passes them on to the serial output interface "Out".

Figure 4:
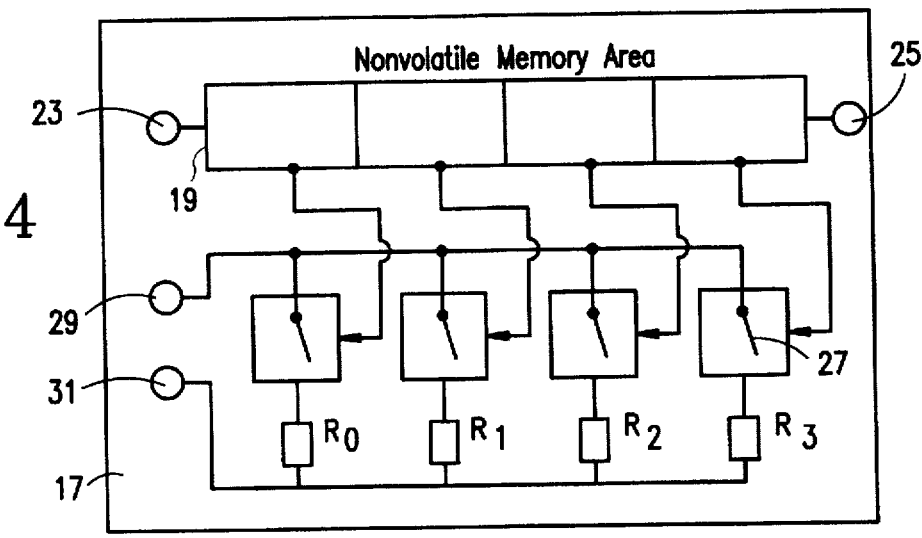
FIG. 4 shows an electronic check unit.

FIG. 4 shows electronic check unit 17 with memory area 19 whose content is determinable with the help of a digital-to-analog converter. In the shown example the digital-to-analog converter is constructed as a parallel connection of resistors. The current path across the individual resistors is connected in accordance with the content of the memory cells. For this purpose the voltage necessary for readout is applied to memory area 19 via contact surfaces 23 and 25 shown, and the signal present on the readout line of a memory cell is used to connect a current path, i.e. at a memory cell content of logic "1" the corresponding current path is closed whereas at a memory content of logic "0" it remains open. The switching function of the memory cells is indicated in the Figure by switches 27. If resistors $R_0$ to $R_i$ have different definite values (e.g. $R_0:R_1 = 2R_0:R_2 = 4R_0...$; $R_i = 2^i R_0$; whereby "i" is the number of memory cells), the parallel connection of the resistors has, in accordance with the closed current paths, a different joint resistance which is definitely determined by the memory content of memory area 19. Thus if one likewise applies a defined voltage to contact surfaces 29 and 31, a current which is a function of the memory content flows in accordance with the closed current paths. A current measurement thus allows definite determination of the memory content of memory area 19.

The resistors associated with the memory cells can be realized by semiconductor technology, as known to the expert, and can thus easily be already provided in integrated circuit 9 or electronic check unit 17 during production thereof.

Figure 5:
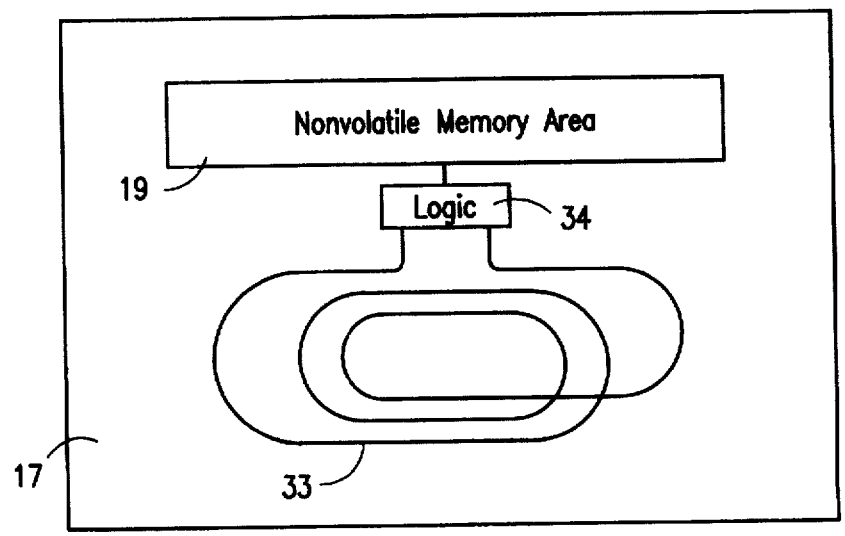
FIG. 5 shows an electronic check unit.

FIG. 5 shows electronic check unit 17 wherein memory area 19 is readable in noncontacting fashion. This can be realized for example by providing coil 33 and control logic 34 in electronic check unit 17 for reading the data from memory area 19 via an external apparatus, as known in the art. Memory area 19 readable via an external apparatus in noncontacting fashion has the advantage that it is unnecessary to remove any casting compound surrounding the integrated circuit of the electronic module before readout.

Figure 6:
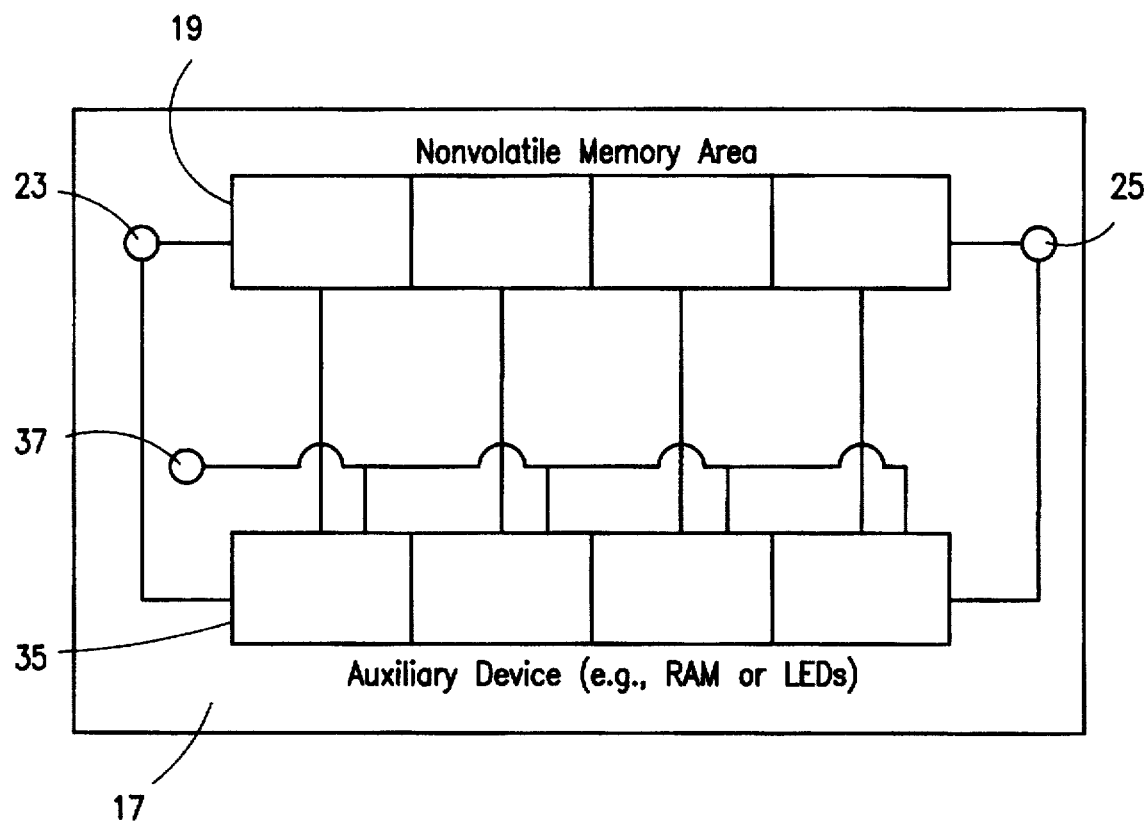
FIG. 6 shows an electronic check unit.

FIG. 6 shows electronic check unit 17 whose memory content is determinable by means of auxiliary device 35. Auxiliary device 35 can have for example an array of light-emitting diodes (LEDs), each LED being associated with a memory cell of nonvolatile memory 19 and lighting up or not lighting up depending on the content of the memory cell. The required supply voltage can be applied to contact surfaces 23 and 25.

In another embodiment auxiliary device 35 has RAM 35 containing exactly as many memory cells as memory area 19. Upon application of the necessary supply voltage to contact surfaces 23 and 25 the content of memory area 19 is copied into RAM 35. For this purpose a clock signal is applied to each memory cell of the RAM via contact surface 37, thereby transferring the data content present at the data output of the nonvolatile memory cell to the RAM cell. The data transferred to RAM 35 can now be easily determined using an electron microscope and converted into optical information, since the quantity of charge in the memory cells which determines the data content is relatively great in a RAM cell.

Finally it should be mentioned that electronic check unit 17 can also be realized in different ways. However, according to the invention electronic check unit 17 is always part of electronic module 3 and has separate means for at least reading the content of the memory located in the electronic check unit.

We claim:

1. A data carrier having an electronic module, comprising:

an integrated circuit including a control unit and at least one first memory for storing data under control of the control unit;

communication means for enabling communication between the integrated circuit and an external apparatus and at least one electronic check unit on the electronic module, said check unit being connected to the control unit via lines and having a surface area which small in comparison with a surface area of the integrated circuit;

wherein the check unit contains at least one nonvolatile memory and means for storing at least a portion of said data in said nonvolatile memory under the control of the control unit, and means for determining the data contained in the non-volatile memory of the check unit, said means for determining data contained in the non-volatile memory being separate from said communications means to permit data to be read from the check unit if a function of the integrated circuit is impaired.

2. The data carrier having an electronic module of claim 1, wherein the electronic check unit is part of the integrated circuit of the module.

3. The data carrier having an electronic module of claim 2, wherein the electronic check unit is located outside preferred break lines of the integrated circuit.

4. The data carrier having an electronic module of claim 1, further comprising means for protecting the electronic check unit from high currents or voltages.

5. The data carrier having an electronic module of claim 1, further comprising additional said electronic check units.

6. The data carrier having an electronic module of claim 1, wherein said means for storing at least a portion of said data in said nonvolatile memory comprises means for storing the latest data record or parts of the latest data record arising in the course of communication of the data carrier with said external apparatus stored in the nonvolatile memory of the electronic check unit.

7. The data carrier having an electronic module of claim 1, wherein said means for determining data read from said nonvolatile memory are the only means in said electronic module capable of reading data from the nonvolatile memory located in the electronic check unit which permit determination of the data stored in the memory.

8. The data carrier having an electronic module of claim 1, further comprising a control logic unit, and means located within the electronic check unit for connecting the electronic check unit to ground, to a supply voltage, to a clock signal, and to a data output.

9. The data carrier having an electronic module of claim 1, further comprising means including a digital-to-analog converter located within the electronic check unit for converting the data stored in the nonvolatile memory to an analog signal.

10. The data carrier having an electronic module of claim 1, wherein the means for determining data stored in the nonvolatile memory comprises means located within the electronic check unit for enabling noncontacting readout of the data stored in the nonvolatile memory.

11. The data carrier having an electronic module of claim 1, wherein the means for determining data stored in the nonvolatile memory comprises light-emitting diodes for determining the data stored in the memory.

12. The data carrier having an electronic module of claim 1, further comprising means for transferring the data stored in the nonvolatile memory to a further memory of the electronic check unit, said data transferred to the further memory being readable from said further memory by means of an electron microscope.

* * * * *